United States Patent
Choi et al.

(10) Patent No.: US 10,795,940 B2
(45) Date of Patent: Oct. 6, 2020

(54) CHATBOT-BASED CLOUD MANAGEMENT SYSTEM AND METHOD FOR OPERATING THE SAME

(71) Applicant: Bespin Global Inc., Seongnam-si, Gyeonggi-do (KR)

(72) Inventors: Jong Mok Choi, Anyang-si (KR); Jun Tai Kim, Seoul (KR); Min Sang Park, Gwangju (KR); Min Soo Jeong, Seoul (KR)

(73) Assignee: Bespin Global Inc., Seongnam-si, Gyeonggi-Do (KR)

( * ) Notice: Subject to any disclaimer, the term of this patent is extended or adjusted under 35 U.S.C. 154(b) by 111 days.

(21) Appl. No.: 16/143,876

(22) Filed: Sep. 27, 2018

(65) Prior Publication Data

US 2019/0147111 A1    May 16, 2019

(30) Foreign Application Priority Data

Nov. 10, 2017   (KR) .................... 10-2017-0149126

(51) Int. Cl.
   *G06F 16/9032*   (2019.01)
   *G06F 11/07*      (2006.01)
   *H04L 12/58*      (2006.01)

(52) U.S. Cl.
   CPC ...... *G06F 16/90332* (2019.01); *G06F 11/079* (2013.01); *H04L 51/02* (2013.01)

(58) Field of Classification Search
   USPC ................................................ 704/7–10, 257
   See application file for complete search history.

(56) References Cited

U.S. PATENT DOCUMENTS

| | | | | |
|---|---|---|---|---|
| 8,068,860 | B1* | 11/2011 | Midkiff | H04W 4/14 455/406 |
| 2005/0021649 | A1* | 1/2005 | Goodman | G06F 21/316 709/207 |
| 2012/0057586 | A1* | 3/2012 | Midkiff | H04W 4/14 370/338 |
| 2015/0130611 | A1* | 5/2015 | Roth | B60K 28/063 340/539.11 |

FOREIGN PATENT DOCUMENTS

KR     10-0522625 B1     10/2005
KR     10-2015-0049541 A     5/2015

* cited by examiner

*Primary Examiner* — Leonard Saint Cyr
(74) *Attorney, Agent, or Firm* — Paratus Law Group, PLLC (57) ABSTRACT

A chatbot-based cloud management system, including: an interface for receiving a query from a client through a plurality of access channels, and delivering a response generated in response to the received query to the client; a chatbot engine for performing a response processing to the query based on a chat learning model learned in advance and a chat knowledge context, and outputting event occurrence information when a request event from the query occurs; and a processing engine for confirming failure occurrence situation of an infra where the request event has occurred and providing it to the chatbot engine by generating failure countermeasures corresponding to the failure occurrence situation based on a failure model learned in advance and a failure processing rule, when event occurrence information is received from the chatbot engine.

12 Claims, 5 Drawing Sheets

CHATBOT-BASED CLOUD MANAGEMENT SYSTEM AND METHOD FOR OPERATING THE SAME

CROSS REFERENCE TO PRIOR APPLICATION

This application claims priority to Korean Patent Application No. 10-2017-0149126 (filed on Nov. 10, 2017) which is hereby incorporated by reference in its entirety.

BACKGROUND

The present disclosure relates to a chatbot-based cloud management system and a method for operating the same, and more particularly, to a chatbot-based cloud management system and a method for operating the same, which can provide an automated solution for an interactive service and a failure countermeasures in real time through a Bot platform.

A CHATBOT service has been making remarkable progress along with big data analysis, machine learning, and natural language processing technology to infer the correct answer based on analysis of user's chat contents, to predict the next question to provide a chat service, and recently, beyond simple chat service, the CHATBOT service is expanding to applications that handle various operations such as shopping and payment.

At the same time, with the activation of a cloud service, the term DevOps, NoOps has long been a new paradigm related with rapid, automated development, operations, and software quality.

The DevOps is a combination of Development and Operations, which means a method for concurrently collaborating with system development and operations. The DevOps is a method for operating through collaboration between development and operations, such that it is not easy to solve quickly when a failure during system operation occurs or additional requirements are generated by a client, etc.

The NoOps is a combination of "No" and "Operation", which means a method for eliminating operational tasks and removing operational elements by human as much as possible.

Accordingly, a recent cloud service has been moving from the DevOps to the NoOps so that it can reduce the operation cost through intelligent resource management, and can devote itself to development and business based on the time that it has been thus secured.

RELATED ART DOCUMENT

Patent Document (Patent Document 1) Korean Registered Patent No. 10-0522625 (Oct. 20, 2005)

SUMMARY

An object of the present disclosure is to provide a chatbot-based cloud management system and a method for operating the same, which enable a client to monitor a resource and operate an infra through bidirectional communication using a chatbot.

In addition, another object of the present disclosure is to provide a chatbot-based cloud management system and a method for operating the same, which can combine an algorithm and an automatic rule that are learned through machine learning to provide a solution to customer's failure countermeasures in real time, and can thereby provide the NoOps environment to a client.

The technical objects of the present disclosure are not limited to the above-described technical objects, and other technical objects that are not described can be clearly understood by those skilled in the art from the following description.

A chatbot-based cloud management system in accordance with an embodiment of the present disclosure for achieving the objects includes an interface for receiving a query from a client through a plurality of access channels, and delivering a response generated in response to the received query to the client; a chatbot engine for performing a response processing to the query based on a chat learning model learned in advance and a chat knowledge context, and outputting event occurrence information when a request event from the query occurs; and a processing engine for confirming failure occurrence situation of an infra where the request event has occurred and providing it to the chatbot engine by generating failure countermeasures corresponding to the failure occurrence situation based on a failure model learned in advance and a failure processing rule, when event occurrence information is received from the chatbot engine.

The chatbot engine includes a DB for storing the chat learning model generated through machine learning of a learning module and the chat knowledge context; a language processing module for analyzing the query and extracting chat information; and a first AI module for extracting chat knowledge corresponding to the extracted chat information based on the chat learning model and the chat knowledge context, and generating a response to the query based on the extracted chat knowledge.

The first AI module determines whether or not the request event occurs based on the chat knowledge, and transmits the event occurrence information to the processing engine when it is confirmed that the request event has occurred.

The request event is a failure processing request event of the infra.

The processing engine includes a DB for storing the failure model generated through machine learning of a learning module and a predetermined failure processing rule; and a second AI module for confirming failure occurrence situation of the infra based on the event occurrence information when the event occurrence information is received from the chatbot engine, and transmitting it to the chatbot engine by generating failure countermeasures corresponding to the failure occurrence situation of the infra based on the failure model learned in advance and the failure processing rule.

The first AI module outputs it to the interface by generating a response corresponding to failure countermeasures of the infra generated by the second AI module.

The processing engine further includes a management module for managing information of the infra, and monitoring the failure processing history information collected from the infra.

The management module reflects it to the infra by extracting a template corresponding to the failure countermeasures of the infra.

A method for operating a chatbot-based cloud management system in accordance with an embodiment of the present disclosure for achieving the objects includes receiving a query from a client through a plurality of access channels; performing a response processing to the query based on a chat learning model learned in advance and a chat knowledge context; confirming failure occurrence situation of an infra where a request event has occurred when the request event from the received query occurs and generating failure countermeasures corresponding to the failure occurrence situation based on a failure model learned in advance and a failure processing rule; and providing it to the client by generating a response corresponding to the failure countermeasures.

According to the present disclosure, it is possible to enable a client to monitor resources and operate an infra through bidirectional communication using a chatbot, thus providing the NoOps environment to a client.

In addition, according to the present disclosure, it is possible to combine an algorithm and an automatic rule that are learned through machine learning to provide a solution to customer's failure countermeasures in real time.

DETAILED DESCRIPTION

Hereinafter, some embodiments of the present disclosure will be described in detail with reference to exemplary drawings. It is to be noted that, in adding reference numerals to the components of the respective drawings, the same components are denoted by the same reference numerals whenever possible, even if they are illustrated in different drawings. In addition, in the following description of the embodiments of the present disclosure, a detailed description of the related known configurations or functions that can obscure the subject of the present disclosure will be omitted.

In describing the components of the embodiment of the present disclosure, the terms such as first, second, A, B, (a), and (b) can be used. These terms are intended to distinguish the components from other components, and the terms do not limit the nature, order or sequence of the components. In addition, unless otherwise defined, all terms used herein, including technical or scientific terms, have the same meaning as commonly understood by those skilled in the art to which the present disclosure pertains. Terms such as those defined in commonly used dictionaries should be interpreted as having a meaning consistent with their meaning in the context of the related art and will not be interpreted in an idealized or overly formal sense unless expressly so defined herein.

Figure 1:
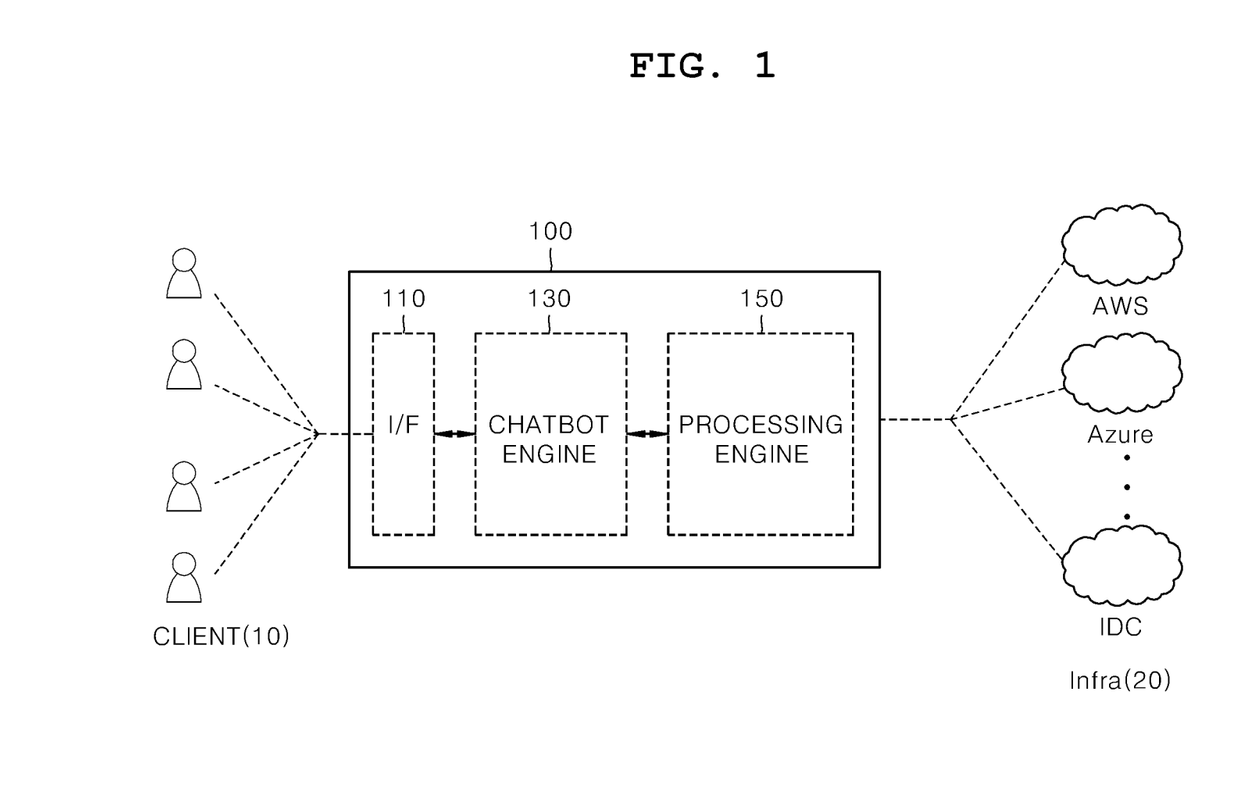
FIG. 1 is a block diagram of a chatbot-based cloud management system in accordance with an embodiment of the present disclosure.

FIG. 1 is a block diagram of a chatbot-based cloud management system in accordance with an embodiment of the present disclosure.

Referring to FIG. 1, a chatbot-based cloud management system 100 in accordance with an embodiment of the present disclosure can include an interface (I/F) 110, a chatbot engine 130, and a processing engine 150.

The interface 110 receives a query from a client 10 through a plurality of channels, and delivers a response generated in response to the received query to the client 10.

Herein, the client 10 can include an electronic device for accessing an infra (e.g., AWS, AZURE, IDS, etc.) 20 for providing a cloud service through wired or wireless communication to receive the cloud service. In addition, the client 10 can access the cloud management system 100 through wired or wireless communication. As an example, the electronic device can include a desktop, a laptop, a notebook, a tablet PC, a smart phone and/or a PDA, etc. Herein, the electronic device can be provided with an application interlocking with the cloud management system 100.

The interface 110 supports an access channel between the client 10 and the cloud management system 100. Herein, the access channel can be a messenger, a web, and/or a message (SMS). Of course, it is to be understood that the type of the access channel supported by the interface 110 is not limited to any one, and it is also possible to support various access channels in the type capable of transmitting and receiving chat information with the client 10.

When the query from the client 10 is received through the interface 110, the chatbot engine 130 analyzes the text corresponding to the received query to extract the chat information. In addition, the chatbot engine 130 recognizes the extracted chat information, and extracts chat knowledge corresponding to the recognized chat information. In this time, the chatbot engine 130 can perform a response processing for the query from the client 10 based on the extracted chat knowledge.

In addition, the chatbot engine 130 can confirm the occurrence of the request event from the extracted chat knowledge. When it is confirmed that the request event has occurred, the chatbot engine 130 can request the processing engine 150 to process the request event.

Herein, a detailed configuration of the chatbot engine 130 will be described in detail with reference to FIG. 2.

Figure 2:
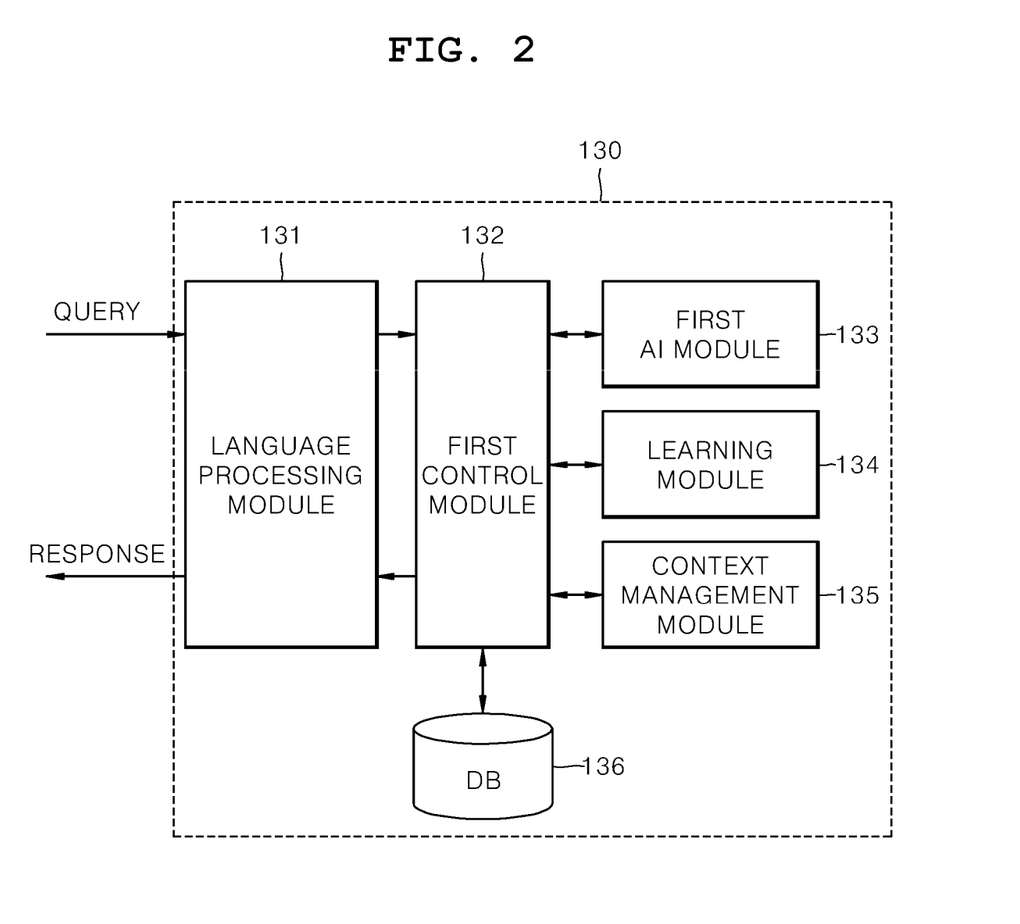
FIG. 2 is a detailed block diagram of a chatbot engine of FIG. 1.

Referring to FIG. 2, the chatbot engine 130 can include a language processing module 131, a first control module 132, a first AI module 133, a learning module 134, a context management module 135, and a DB 136.

The language processing module 131 analyzes the query received from the client 10 through the interface 110 and extracts chat information. Herein, the language processing module 131 can extract the chat information by performing a syntax analysis on the query of the text form.

In addition, the language processing module 131 can also convert a voice-type query into a text form, and extract the chat information by performing a syntax analysis on the query converted into the text form. In this case, the language processing module 131 can include a module for recognizing a voice-type query and a module for processing a voice recognition result in a natural language form that the first AI module 133 can recognize. In addition, the language processing module 131 can further include a module for synthesizing the response of the first AI module 133 into a sentence, and a module for synthesizing the synthesized sentence into a voice and outputting it.

The first control module 132 delivers the chat information extracted by the language processing module 131 to the first AI module 133.

The first AI module 133 operates by interlocking with the learning module 134 and/or the context management module 135. The first AI module 133 extracts chat knowledge corresponding to the chat information extracted by the language processing module 131 based on the chat learning model generated by the learning module 134 and/or the chat knowledge context managed by the context management module 135.

The first AI module 133 generates a response based on the extracted chat knowledge. Accordingly, the first control module 132 delivers the response generated by the first AI module 133 to the language processing module 131, and the language processing module 131 converts the response delivered from the first control module 132 into a form that can be provided to the client 10 to transmit it to the interface 110.

Herein, the first AI module 133 can determine whether or not the request event of the client 10 has occurred from the chat knowledge extracted by the language processing module 131. The request event can be a failure processing request event.

The first AI module 133 transmits event occurrence information to the processing engine 150 when the request event of the client 10 occurs. Herein, the event occurrence information can include information notifying the occurrence of the request event and the chat knowledge extracted from the interface 110.

Accordingly, the processing engine 150 can generate countermeasures to the request event. When the countermeasures to the request event are received from the processing engine 150, the first AI module 133 generates a response for the received countermeasures. Accordingly, the first control module 132 delivers the response generated by the first AI module 133 to the language processing module 131, and the language processing module 131 converts the response delivered from the first control module 132 into a form that can be provided to the client 10 to transmit it through the interface 110.

The learning module 134 performs MACHINE LEARNING based on the chat contents between the client 10 and the chatbot engine 130 to generate a chat learning model, and stores the generated chat learning model in the DB 136. The chat learning model stored in the DB 136 can be used by the first AI module 133 to extract chat knowledge.

The context management module 135 stores and manages a chat context in which the response and/or processing pattern corresponding to a plurality of queries are defined in the DB 136. The context management module 135 can manage the chat knowledge context stored in the DB 136, and when there is a separate request from the first AI module 133, it invokes one or more chat knowledge contexts related to chat information to provide it to the first AI module 133.

The DB 136 can store data and/or algorithms, etc. that are necessary for the chatbot engine 130 to operate. Herein, the DB 136 can include a storage medium such as a Random Access Memory (RAM), a Static Random Access Memory (SRAM), a Read-Only Memory (ROM), a Programmable Read-Only Memory (PROM), an Electrically Erasable Programmable Read-Only Memory (EEPROM). In FIG. 2, the DB 136 is the form implemented to be included in the chatbot engine 130, but the DB 136 can be separately provided from the chatbot engine 130 to be implemented to be interlocked with the chatbot engine 130.

When the event occurrence information is received from the chatbot engine 130, the processing engine 150 confirms the current situation based on the received event occurrence information. For example, the processing engine 150 can confirm the failure occurrence situation of the infra 20 based on the chat knowledge included in the event occurrence information. Accordingly, the processing engine 150 can generate countermeasures for a situation where the request event occurs based on a predetermined failure processing rule and/or a failure model previously learned, and transmit the generated countermeasures to the chatbot engine 130.

A detailed configuration of the processing engine 150 will be described in more detail with reference to FIG. 3.

Figure 3:
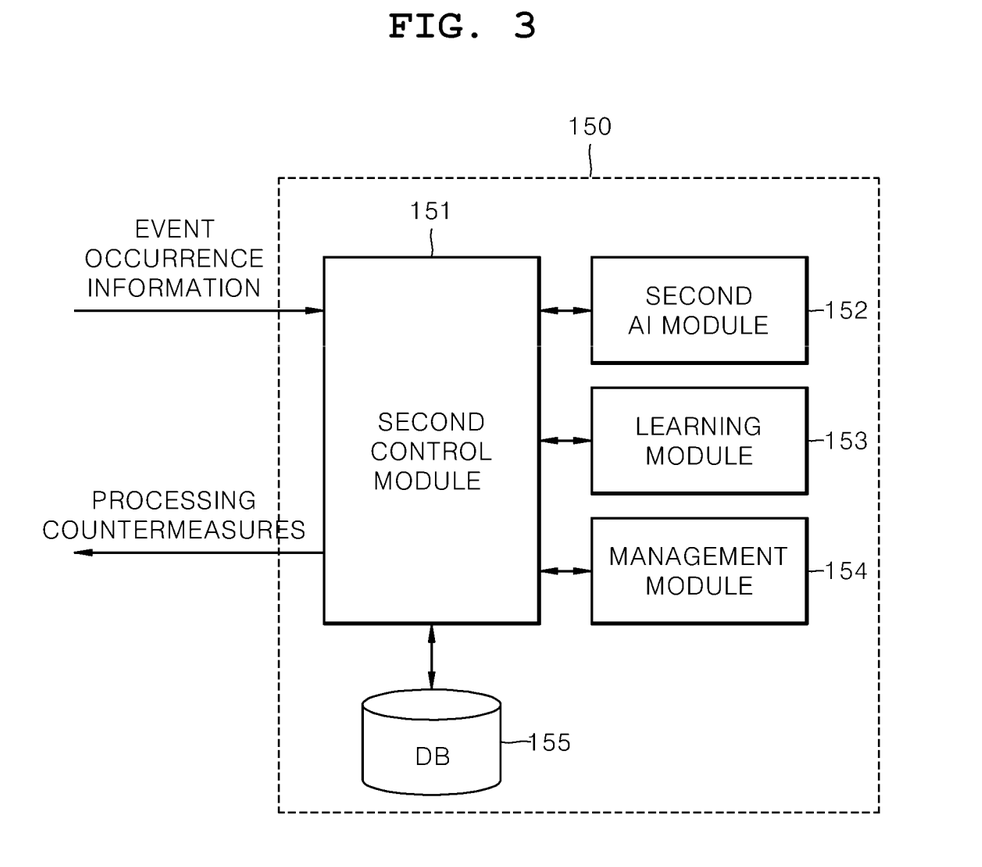
FIG. 3 is a detailed block diagram of a processing engine of FIG. 1.

Referring to FIG. 3, the processing engine 150 can include a second control module 151, a second AI module 152, a learning module 153, a management module 154, and a DB 155.

The second control module 151 collects performance information, failure information, and/or failure countermeasures history information, etc. of the infra 20 at a predetermined cycle or upon the occurrence of a specific event to store it in the DB 155. In this time, the learning module 153 performs MACHINE LEARNING based on the performance information, failure information, and/or failure countermeasures history information, etc. of the infra 20 stored in the DB 155, and generates a failure model for deriving failure countermeasures. The generated failure model can be stored in the DB 155.

In addition, the second control module 151 can define a processing rule depending upon a plurality of request event occurrence situations in advance, and store the defined processing rule in the DB 155. In this time, the second control module 151 can also receive the processing rule depending upon the respective request event occurrence situations from an external system to store it in the DB 155. For example, the second control module 151 can store the failure processing rule depending upon the plurality of failure occurrence situations in the DB 155.

Meanwhile, the management module 154 stores and manages the information of each infra 20 in the DB 155. In this time, the management module 154 can manage by classifying the failure model and/or the failure processing rule depending upon the failure occurrence situations for each infra 20. In addition, the management module 154 can manage template information corresponding to the failure countermeasures of each infra 20.

For example, the template can include a template for performing a restart operation of an OS (Operating System) of the infra 20, a template for performing a restart operation of each application of the infra 20, and/or a template for performing an Auto Scale operation of the infra 20.

The DB 155 can store data and/or algorithms that are necessary for the processing engine 150 to operate. For example, the DB 155 can store the failure model generated by the learning module 153, and store a failure processing rule for the plurality of failure occurrence situations. In addition, the DB 155 can also store template information corresponding to the failure countermeasures. Herein, the DB 155 can include a storage medium such as a Random Access Memory (RAM), a Static Random Access Memory (SRAM), a Read-Only Memory (ROM), a Programmable Read-Only Memory (PROM), an Electrically Erasable Programmable Read-Only Memory (EEPROM). In FIG. 3, the DB 155 is the form implemented to be included in the processing engine 150. Herein, the DB 155 can be separately provided from the processing engine 150 and can be also implemented to be interlocked with the processing engine 150.

Meanwhile, when the event occurrence information is received from the chatbot engine 130, the second control module 151 delivers the event occurrence information to the second AI module 152.

Accordingly, when the event occurrence information is received, the second AI module 152 confirms the request event occurrence situation based on the chat knowledge. For example, the second AI module 152 can confirm the failure occurrence situation of the specific infra 20 based on the chat knowledge included in the event occurrence information. In this time, the second AI module 152 generates failure countermeasures for the failure occurrence situation of the corresponding infra 20 based on the failure model and/or the failure processing rule stored in the DB 155, and delivers the generated failure countermeasures to the second control module 151.

The second control module 151 transmits the failure countermeasures generated by the second AI module 152 to the chatbot engine 130. Accordingly, the chatbot engine 130 can generate a response for the failure countermeasures received from the second control module 151 of the processing engine 150, and can provide the generated response to the client 10 to process the response to the request event of the client 10 in real time.

Meanwhile, the management module 154 monitors the failure processing history information collected from the corresponding infra 20 by the second control module 151 after providing the failure countermeasures for the failure occurrence situation of the specific infra 20. When the failure occurrence situation of the corresponding infra 20 is not resolved even after a predetermined time elapses, the management module 154 can extract the template corresponding to the failure countermeasures of the corresponding infra 20 from the DB 155 to reflect it to the corresponding infra 20.

An operation flow of the chatbot-based cloud management system 100 in accordance with the present disclosure configured as in the above will be described in more detail as follows.

Figure 4:
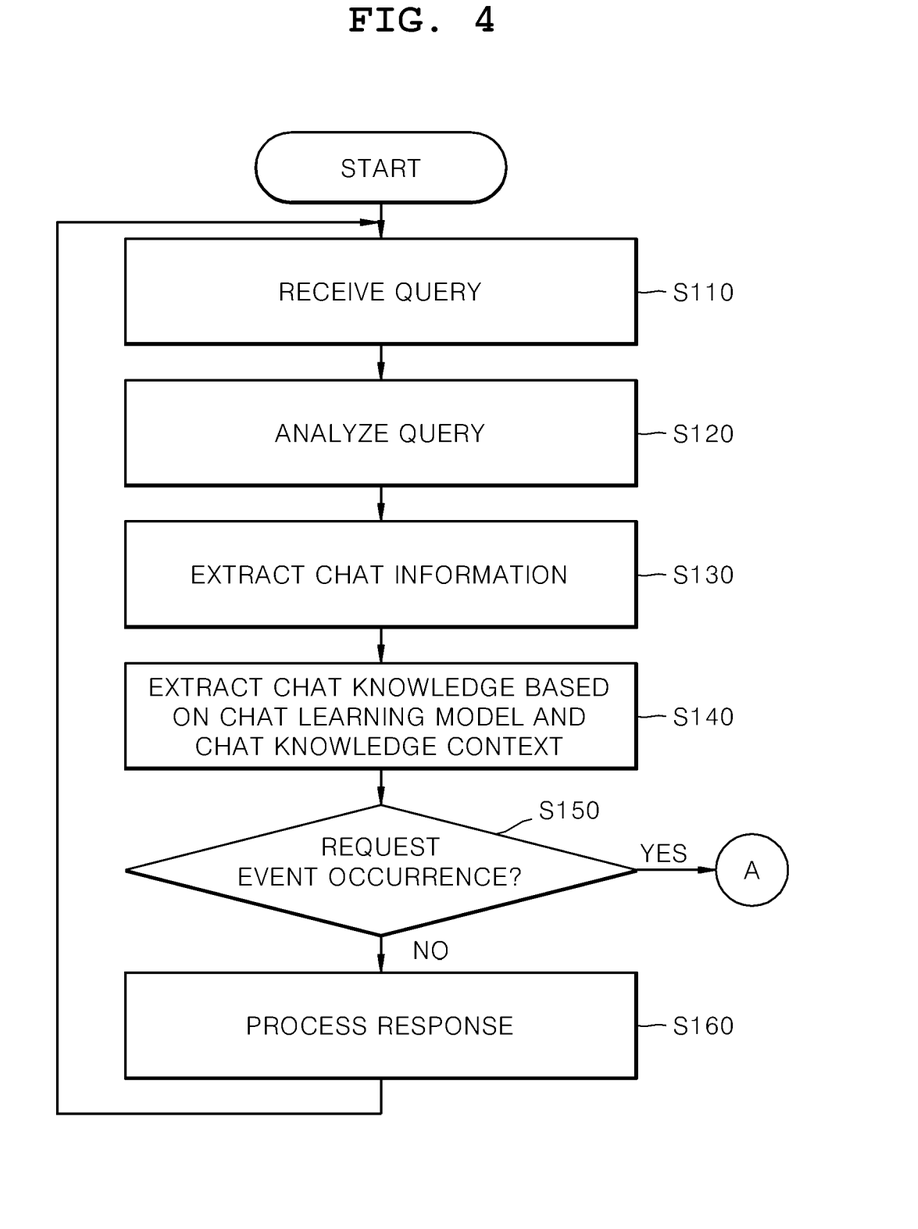
FIGS. 4 and 5 are flowcharts illustrating a method for operating the chatbot-based cloud management system in accordance with an embodiment of the present disclosure.
Figure 5:
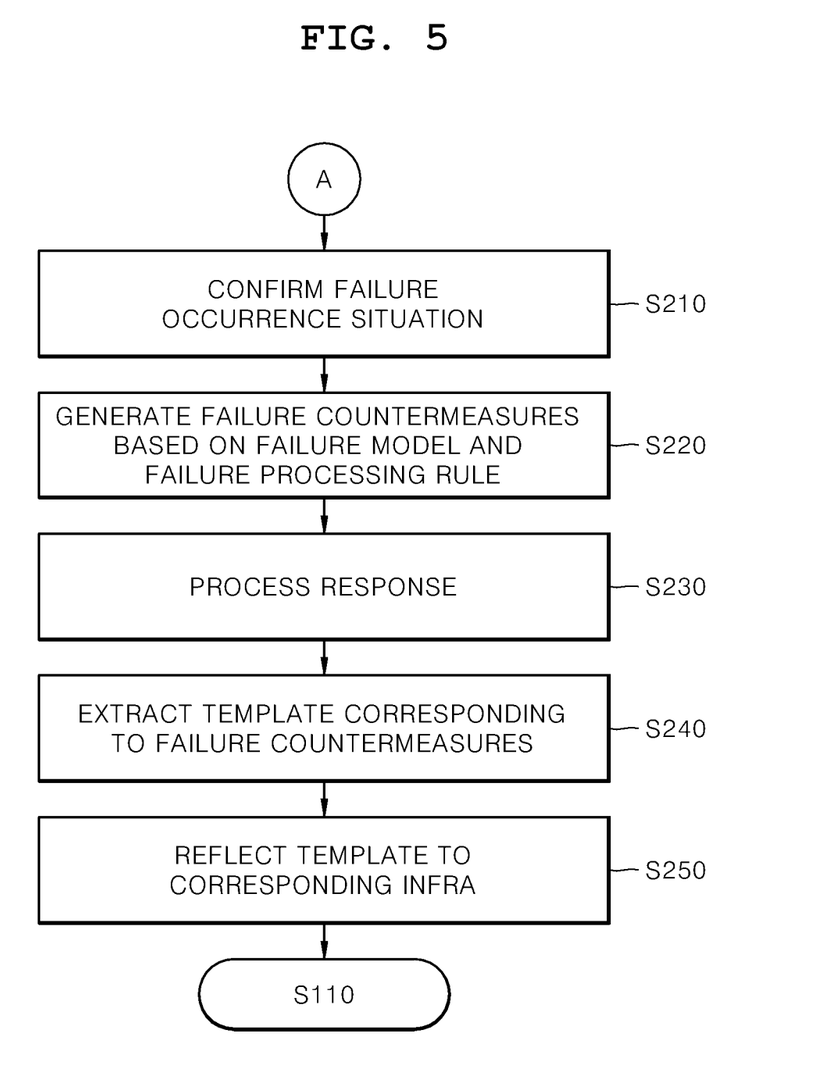

FIGS. 4 and 5 are flowcharts illustrating a method for operating the chatbot-based cloud management system in accordance with an embodiment of the present disclosure.

Referring to FIGS. 4 and 5, the chatbot engine 130 of the cloud management system 100 receives a query from the client 10 through the interface 110 S110, analyzes the received query S120, and extracts chat information S130. Herein, when the query is a text form, the chatbot engine 130 classifies and analyzes the text to extract the chat information. Meanwhile, when the query is a voice form, the chatbot engine 130 can convert the query into a text form through voice recognition, and classify and analyze the converted text to extract the chat information.

Then, the chatbot engine 130 invokes a chat learning model and/or chat knowledge context that are learned in advance and stored in the DB 136, and extracts the chat knowledge corresponding to the extracted chat information in the 'S130' based on the invoked chat learning model and/or chat knowledge context S140.

In this time, the chatbot engine 130 determines whether or not a request event of the client 10 has occurred from the chat knowledge extracted in the 'S130' S150. Herein, the request event of the client 10 can be a failure processing request event of a specific infra 20.

When it is determined in the 'S150' that the request event has not occurred, the chatbot engine 130 responds to the client 10 based on the chat knowledge extracted in the 'S140' S160. In this manner, the chatbot engine 130 can repeatedly perform 'S110' to 'S160'.

Meanwhile, when the chat knowledge extracted in the 'S140' is related to the failure resolution of the specific infra 20, the chatbot engine 130 determines that a request event has occurred to transmit the event occurrence information to the processing engine 150. Accordingly, the processing engine 150 performs the procedures after (A) of FIG. 5 based on the event occurrence information received from the chatbot engine.

The processing engine 150 recognizes the failure occurrence situations based on the event occurrence information received from the chatbot engine 130 S210.

Then, the processing engine 150 invokes the failure model and/or failure processing rule that are learned in advance and stored in the DB 155, and generates failure countermeasures corresponding to the failure occurrence situation confirmed in the 'S210' based on the invoked failure model and/or failure processing rule S220.

The processing engine 150 transmits the failure countermeasures generated in the 'S220' to the chatbot engine 130. Accordingly, the chatbot engine 130 performs a response processing corresponding to the request event to the client 10 based on the failure countermeasures generated in the 'S220' S230.

Then, the processing engine 150 monitors the failure processing history information collected from the corresponding infra 20. When the failure occurrence situation of the corresponding infra 20 is not resolved even after a predetermined time elapses, the processing engine 150 can extract a template corresponding to the failure countermeasures of the corresponding infra 20 from the DB 155 S240 to reflect it to the corresponding infra 20 S250.

The processing engine 150 can also perform an evaluation of the failure processing history based on information collected from the corresponding infra 20.

Herein, the processing engine 150 can confirm the processing history through the chatbot engine 130, and automatically access a server through the template corresponding to the processing history confirmed through the chatbot engine 130 to execute the evaluation. In this time, the evaluation can be executed based on the results obtained through the machine learning, for example, performance information of the infra, alarm and/or failure information of the infra, execution information of the template for processing the alarm and/or failure of the infra, etc.

The chatbot-based cloud management system 100 in accordance with the present embodiment operating as described above can be implemented as an independent hardware device including a memory and a processor for processing each operation, and can be operated as the form included in another hardware device such as a microprocessor or a general-purpose computer system. In addition, the chatbot engine 130, the processing engine 150, and the respective modules included in each engine of the chatbot-based cloud management system 100 in accordance with the present embodiment can be implemented as at least one processor.

The above description is merely illustrative of the technical spirit of the present disclosure, and various modifications and changes can be made by those skilled in the art without departing from the essential characteristics of the present disclosure.

Accordingly, the embodiments disclosed in the present disclosure are not intended to limit the technical spirit of the present disclosure but to explain it, and the scope of the present disclosure is not limited by these embodiments. The protection scope of the present disclosure should be construed in accordance with the following claims, and all technical spirits within the scope of equivalents thereof should be construed as being included in the scope of the present disclosure.

What is claimed is:

1. A chatbot-based cloud management system, comprising:
    an interface for receiving a query from a client through a plurality of access channels, and delivering a response generated in response to the received query to the client;

a chatbot engine for performing a response processing to the query based on a chat learning model learned in advance and a chat knowledge context, and outputting event occurrence information when a request event from the query occurs; and a processing engine for confirming failure occurrence situation of an infra where the request event has occurred and providing it to the chatbot engine by generating failure countermeasures corresponding to the failure occurrence situation based on a failure model learned in advance and a failure processing rule, when event occurrence information is received from the chatbot engine, wherein the chatbot engine comprises:

a DB for storing the chat learning model generated through machine learning of a learning module and the chat knowledge context;

a language processing module for analyzing the query and extracting chat information; and a first AI module for extracting chat knowledge corresponding to the extracted chat information based on the chat learning model and the chat knowledge context, and generating a response to the query based on the extracted chat knowledge.

2. The chatbot-based cloud management system of claim 1, wherein the first AI module determines whether or not the request event occurs based on the chat knowledge, and transmits the event occurrence information to the processing engine when it is confirmed that the request event has occurred.

3. The chatbot-based cloud management system of claim 2, wherein the request event is a failure processing request event of the infra.

4. A chatbot-based cloud management system, comprising:

an interface for receiving a query from a client through a plurality of access channels, and delivering a response generated in response to the received query to the client;

a chatbot engine for performing a response processing to the query based on a chat learning model learned in advance and a chat knowledge context, and outputting event occurrence information when a request event from the query occurs; and a processing engine for confirming failure occurrence situation of an infra where the request event has occurred and providing it to the chatbot engine by generating failure countermeasures corresponding to the failure occurrence situation based on a failure model learned in advance and a failure processing rule, when event occurrence information is received from the chatbot engine, wherein the processing engine comprises:

a DB for storing the failure model generated through machine learning of a learning module and a predetermined failure processing rule; and a second AI module for confirming failure occurrence situation of the infra based on the event occurrence information when the event occurrence information is received from the chatbot engine, and transmitting it to the chatbot engine by generating failure countermeasures corresponding to the failure occurrence situation of the infra based on the failure model and the failure processing rule.

5. The chatbot-based cloud management system of claim 4, wherein the learning module generates the failure model for deriving the failure countermeasures by performing machine learning based on at least one of performance information, failure information, and failure processing history information that are collected from the infra.

6. The chatbot-based cloud management system of claim 4, wherein the processing engine further comprises a management module for managing information of the infra, and monitoring the failure processing history information collected from the infra.

7. The chatbot-based cloud management system of claim 6, wherein the management module reflects it to the infra by extracting a template corresponding to the failure countermeasures of the infra.

8. A method for operating a chatbot-based cloud management system, comprising:

receiving a query from a client through a plurality of access channels;

performing a response processing to the query based on a chat learning model learned in advance and a chat knowledge context;

confirming failure occurrence situation of an infra where a request event has occurred when the request event from the received query occurs and generating failure countermeasures corresponding to the failure occurrence situation based on a failure model learned in advance and a failure processing rule; and providing it to the client by generating a response corresponding to the failure countermeasures, wherein the performing the response processing to the query comprises:

analyzing the query and extracting chat information;

extracting chat knowledge corresponding to the extracted chat information based on the chat learning model and the chat knowledge context; and generating a response to the query based on the extracted chat knowledge.

9. The method for operating a chatbot-based cloud management system of claim 8, wherein the request event is a failure processing request event of the infra.

10. The method for operating a chatbot-based cloud management system of claim 8, further comprising managing information of the infra, and collecting at least one of performance information, failure information, and failure processing history information from the infra.

11. The method for operating a chatbot-based cloud management system of claim 8, further comprising reflecting it to the infra by extracting a template corresponding to the failure countermeasures of the infra.

12. A method for operating a chatbot-based cloud management system, comprising:

receiving a query from a client through a plurality of access channels;

performing a response processing to the query based on a chat learning model learned in advance and a chat knowledge context;

confirming failure occurrence situation of an infra where a request event has occurred when the request event from the received query occurs and generating failure countermeasures corresponding to the failure occurrence situation based on a failure model learned in advance and a failure processing rule;

providing it to the client by generating a response corresponding to the failure countermeasures;

managing information of the infra, and collecting at least one of performance information, failure information, and failure processing history information from the infra; and generating the failure model for deriving failure countermeasures by performing machine learning based on at least one of the performance information, the failure information, and the failure processing history information that are collected from the infra before the generating the failure countermeasures.

* * * * *